US012270970B2

(12) United States Patent
Haba et al.

(10) Patent No.: US 12,270,970 B2
(45) Date of Patent: *Apr. 8, 2025

(54) DIRECT-BONDED LAMINATION FOR IMPROVED IMAGE CLARITY IN OPTICAL DEVICES

(71) Applicant: ADEIA SEMICONDUCTOR BONDING TECHNOLOGIES INC., San Jose, CA (US)

(72) Inventors: Belgacem Haba, Saratoga, CA (US); Rajesh Katkar, Milpitas, CA (US); Ilyas Mohammed, San Jose, CA (US)

(73) Assignee: ADEIA SEMICONDUCTOR BONDING TECHNOLOGIES INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/587,921

(22) Filed: Jan. 28, 2022

(65) Prior Publication Data

US 2022/0155490 A1 May 19, 2022

Related U.S. Application Data (63) Continuation of application No. 16/176,191, filed on Oct. 31, 2018, now Pat. No. 11,256,004.

(Continued)

(51) Int. Cl.
*G02B 1/10* (2015.01)
*G02B 1/02* (2006.01)
(Continued)

(52) U.S. Cl.
CPC ............... *G02B 1/10* (2013.01); *G02B 1/02* (2013.01); *G02B 27/0172* (2013.01); *G02B 6/0055* (2013.01); *G02B 2027/0178* (2013.01)

(58) Field of Classification Search
CPC ........ G02B 1/02; G02B 1/10; G02B 27/0172; G02B 6/0055
(Continued)

(56) References Cited

U.S. PATENT DOCUMENTS

| 4,998,665 A | 3/1991 | Hayashi |
| 5,015,052 A | 5/1991 | Ridgway et al. |

(Continued)

FOREIGN PATENT DOCUMENTS

| CN | 106206872 A | 12/2016 |
| EP | 1 441 410 B1 | 4/2006 |

(Continued)

OTHER PUBLICATIONS

Amirfeiz et al., "Formation of silicon structures by plasma-activated wafer bonding," Journal of the Electrochemical Society, 2000, vol. 147, No. 7, pp. 2693-2698.

(Continued)

*Primary Examiner* — Ricky D Shafer
(74) *Attorney, Agent, or Firm* — Knobbe, Martens, Olson & Bear, LLP (57) ABSTRACT

Direct-bonded lamination for improved image clarity in optical devices is provided. An example process planarizes and plasma-activates optical surfaces to be laminated together, then forms direct bonds between the two surfaces without an adhesive or adhesive layer. This process provides improved optics with higher image brightness, less light scattering, better resolution, and higher image fidelity. The direct bonds also provide a refractory interface tolerant of much higher temperatures than conventional optical adhesives. The example process can be used to produce many types of improved optical components, such as improved laminated lenses, mirrors, beam splitters, collimators, prism systems, optical conduits, and mirrored waveguides for (Continued)

smartglasses and head-up displays (HUDs), which provide better image quality and elimination of the dark visual lines that are apparent to a human viewer when conventional adhesives are used in conventional lamination.

28 Claims, 4 Drawing Sheets

Related U.S. Application Data (60) Provisional application No. 62/645,633, filed on Mar. 20, 2018.

(51) Int. Cl.
*G02B 27/01* (2006.01)
*F21V 8/00* (2006.01)

(58) Field of Classification Search
USPC .......................................................... 359/883
See application file for complete search history.

(56) References Cited

U.S. PATENT DOCUMENTS

| | | |
|---|---|---|
| 5,087,585 A | 2/1992 | Hayashi |
| 5,225,797 A | 7/1993 | Schary et al. |
| 5,322,593 A | 6/1994 | Hasegawa et al. |
| 5,363,464 A | 11/1994 | Way et al. |
| 5,408,053 A | 4/1995 | Young |
| 5,471,090 A | 11/1995 | Deutsch et al. |
| 5,557,120 A | 9/1996 | Martin et al. |
| 5,753,536 A | 5/1998 | Sugiyama et al. |
| 5,771,555 A | 6/1998 | Eda et al. |
| 5,785,874 A | 7/1998 | Eda |
| 5,818,631 A | 10/1998 | Askinazi et al. |
| 5,985,739 A | 11/1999 | Plettner et al. |
| 5,998,808 A | 12/1999 | Matsushita |
| 6,008,126 A | 12/1999 | Leedy |
| 6,080,640 A | 6/2000 | Gardner et al. |
| 6,084,714 A | 7/2000 | Ushiyama et al. |
| 6,108,472 A | 8/2000 | Rickman et al. |
| 6,115,264 A | 9/2000 | Nosaka |
| 6,242,324 B1 | 6/2001 | Kub et al. |
| 6,265,775 B1 | 7/2001 | Seyyedy |
| 6,300,161 B1 | 10/2001 | Goetz et al. |
| 6,374,770 B1 | 4/2002 | Lee |
| 6,404,550 B1 | 6/2002 | Yajima |
| 6,418,029 B1 | 7/2002 | McKee et al. |
| 6,423,640 B1 | 7/2002 | Lee et al. |
| 6,429,532 B1 | 8/2002 | Han et al. |
| 6,442,321 B1 | 8/2002 | Berini |
| 6,465,892 B1 | 10/2002 | Suga |
| 6,614,960 B2 | 9/2003 | Berini |
| 6,638,808 B1 | 10/2003 | Ochi |
| 6,713,871 B2 | 3/2004 | Searls et al. |
| 6,759,692 B1 | 7/2004 | Ochi |
| 6,762,796 B1 | 7/2004 | Nakajoh et al. |
| 6,782,179 B2 | 8/2004 | Bozhevolnyi et al. |
| 6,801,691 B2 | 10/2004 | Berini |
| 6,868,258 B2 | 3/2005 | Hayata et al. |
| 6,887,769 B2 | 5/2005 | Kellar et al. |
| 6,908,027 B2 | 6/2005 | Tolchinsky et al. |
| 6,908,832 B2 | 6/2005 | Farrens et al. |
| 6,936,854 B2 | 8/2005 | Iwasaki et al. |
| 6,962,835 B2 | 11/2005 | Tong et al. |
| 7,010,183 B2 | 3/2006 | Estes et al. |
| 7,045,453 B2 | 5/2006 | Canaperi et al. |
| 7,060,634 B2 * | 6/2006 | Rantala ............... H01L 23/5329 |
| | | 438/631 |
| 7,078,811 B2 | 7/2006 | Suga |
| 7,105,980 B2 | 9/2006 | Abbott et al. |
| 7,126,212 B2 | 10/2006 | Enquist et al. |
| 7,144,827 B2 * | 12/2006 | Rantala ............ H01L 21/02216 |
| | | 562/405 |
| 7,193,423 B1 | 3/2007 | Dalton et al. |
| 7,339,798 B2 | 3/2008 | Chakravorty |
| 7,354,798 B2 | 4/2008 | Pogge et al. |
| 7,355,836 B2 | 4/2008 | Radhakrishnan et al. |
| 7,547,954 B2 | 6/2009 | Geusic et al. |
| 7,614,771 B2 | 11/2009 | McKechnie et al. |
| 7,626,216 B2 | 12/2009 | McKinzie, III |
| 7,705,691 B2 | 4/2010 | Lu et al. |
| 7,736,945 B2 | 6/2010 | Schiaffino et al. |
| 7,741,724 B2 | 6/2010 | Morikawa et al. |
| 7,746,663 B2 | 6/2010 | Hashimoto |
| 7,750,488 B2 | 7/2010 | Patti et al. |
| 7,791,429 B2 | 9/2010 | Chen et al. |
| 7,803,693 B2 | 9/2010 | Trezza |
| 8,009,763 B2 | 8/2011 | Risk et al. |
| 8,130,821 B2 | 3/2012 | Hopkins et al. |
| 8,153,505 B2 | 4/2012 | Tong et al. |
| 8,183,127 B2 | 5/2012 | Patti et al. |
| 8,211,722 B2 | 7/2012 | Lu |
| 8,241,961 B2 | 8/2012 | Kim et al. |
| 8,300,312 B2 | 10/2012 | Kobayashi et al. |
| 8,314,007 B2 | 11/2012 | Vaufredaz |
| 8,349,635 B1 | 1/2013 | Gan et al. |
| 8,357,931 B2 | 1/2013 | Schieck et al. |
| 8,377,798 B2 | 2/2013 | Peng et al. |
| 8,436,457 B2 | 5/2013 | Crisp et al. |
| 8,441,111 B2 | 5/2013 | Crisp et al. |
| 8,441,131 B2 | 5/2013 | Ryan |
| 8,476,146 B2 | 7/2013 | Chen et al. |
| 8,476,165 B2 | 7/2013 | Trickett et al. |
| 8,482,132 B2 | 7/2013 | Yang et al. |
| 8,483,253 B2 | 7/2013 | Budd et al. |
| 8,501,537 B2 | 8/2013 | Sadaka et al. |
| 8,524,533 B2 | 9/2013 | Tong et al. |
| 8,558,636 B2 | 10/2013 | Shin et al. |
| 8,620,164 B2 | 12/2013 | Heck et al. |
| 8,647,987 B2 | 2/2014 | Yang et al. |
| 8,657,448 B2 * | 2/2014 | Kobayashi ......... G03B 21/2073 |
| | | 359/489.08 |
| 8,697,493 B2 | 4/2014 | Sadaka |
| 8,698,323 B2 | 4/2014 | Mohammed et al. |
| 8,716,105 B2 | 5/2014 | Sadaka et al. |
| 8,764,197 B2 * | 7/2014 | Kobayashi ........... G02B 27/285 |
| | | 359/485.05 |
| 8,802,538 B1 | 8/2014 | Liu et al. |
| 8,809,123 B2 | 8/2014 | Liu et al. |
| 8,841,002 B2 | 9/2014 | Tong |
| 8,865,489 B2 | 10/2014 | Rogers et al. |
| 8,916,448 B2 | 12/2014 | Cheng et al. |
| 8,929,077 B2 | 1/2015 | Gouramanis |
| 8,988,299 B2 | 3/2015 | Kam et al. |
| 9,022,571 B2 * | 5/2015 | Kawase .................... C08J 5/12 |
| | | 359/483.01 |
| 9,093,350 B2 | 7/2015 | Endo et al. |
| 9,142,517 B2 | 9/2015 | Liu et al. |
| 9,171,756 B2 | 10/2015 | Enquist et al. |
| 9,179,584 B2 | 11/2015 | La Porta et al. |
| 9,184,125 B2 | 11/2015 | Enquist et al. |
| 9,224,704 B2 | 12/2015 | Landru |
| 9,230,941 B2 | 1/2016 | Chen et al. |
| 9,257,399 B2 | 2/2016 | Kuang et al. |
| 9,263,186 B2 | 2/2016 | Li et al. |
| 9,299,736 B2 | 3/2016 | Chen et al. |
| 9,312,229 B2 | 4/2016 | Chen et al. |
| 9,331,149 B2 | 5/2016 | Tong et al. |
| 9,337,235 B2 | 5/2016 | Chen et al. |
| 9,368,866 B2 | 6/2016 | Yu |
| 9,385,024 B2 | 7/2016 | Tong et al. |
| 9,391,143 B2 | 7/2016 | Tong et al. |
| 9,394,161 B2 | 7/2016 | Cheng et al. |
| 9,431,368 B2 | 8/2016 | Enquist et al. |
| 9,434,145 B2 * | 9/2016 | Erdogan ................ G02B 5/285 |
| 9,437,572 B2 | 9/2016 | Chen et al. |
| 9,443,796 B2 | 9/2016 | Chou et al. |
| 9,461,007 B2 | 10/2016 | Chun et al. |
| 9,496,202 B2 | 11/2016 | Hashimoto |
| 9,496,239 B1 | 11/2016 | Edelstein et al. |
| 9,536,848 B2 | 1/2017 | England et al. |
| 9,537,199 B2 | 1/2017 | Dang et al. |

(56) References Cited

U.S. PATENT DOCUMENTS

| | | |
|---|---|---|
| 9,551,880 B2 * | 1/2017 | Amitai .............. G02B 5/3083 |
| 9,559,081 B1 | 1/2017 | Lai et al. |
| 9,618,834 B2 * | 4/2017 | Miyabara ............ G02B 27/286 |
| 9,620,481 B2 | 4/2017 | Edelstein et al. |
| 9,625,713 B2 | 4/2017 | Helie et al. |
| 9,656,852 B2 | 5/2017 | Cheng et al. |
| 9,671,572 B2 | 6/2017 | Decker et al. |
| 9,711,694 B2 | 7/2017 | Robin et al. |
| 9,723,716 B2 | 8/2017 | Meinhold |
| 9,728,521 B2 | 8/2017 | Tsai et al. |
| 9,741,620 B2 | 8/2017 | Uzoh et al. |
| 9,744,754 B2 | 8/2017 | Wakamatsu et al. |
| 9,799,587 B2 | 10/2017 | Fujii et al. |
| 9,847,458 B2 | 12/2017 | Lee et al. |
| 9,852,988 B2 | 12/2017 | Enquist et al. |
| 9,881,882 B2 | 1/2018 | Hsu et al. |
| 9,893,004 B2 | 2/2018 | Yazdani |
| 9,899,442 B2 | 2/2018 | Katkar |
| 9,929,050 B2 | 3/2018 | Lin |
| 9,935,088 B2 | 4/2018 | Budd et al. |
| 9,941,241 B2 | 4/2018 | Edelstein et al. |
| 9,941,243 B2 | 4/2018 | Kim et al. |
| 9,953,941 B2 | 4/2018 | Enquist |
| 9,960,142 B2 | 5/2018 | Chen et al. |
| 9,960,152 B2 | 5/2018 | Bono et al. |
| 10,002,844 B1 | 6/2018 | Wang et al. |
| 10,026,605 B2 | 7/2018 | Doub et al. |
| 10,075,657 B2 | 9/2018 | Fahim et al. |
| 10,204,893 B2 | 2/2019 | Uzoh et al. |
| 10,269,756 B2 | 4/2019 | Uzoh |
| 10,276,619 B2 | 4/2019 | Kao et al. |
| 10,276,909 B2 | 4/2019 | Huang et al. |
| 10,418,277 B2 | 9/2019 | Cheng et al. |
| 10,446,487 B2 | 10/2019 | Huang et al. |
| 10,446,532 B2 | 10/2019 | Uzoh et al. |
| 10,475,778 B2 | 11/2019 | Pfeuffer et al. |
| 10,508,030 B2 | 12/2019 | Katkar et al. |
| 10,522,499 B2 | 12/2019 | Enquist et al. |
| 10,571,699 B1 | 2/2020 | Parsons et al. |
| 10,629,577 B2 | 4/2020 | Tao et al. |
| 10,707,087 B2 | 7/2020 | Uzoh et al. |
| 10,707,374 B2 | 7/2020 | Danesh et al. |
| 10,784,191 B2 | 9/2020 | Huang et al. |
| 10,790,262 B2 | 9/2020 | Uzoh et al. |
| 10,840,135 B2 | 11/2020 | Uzoh |
| 10,840,205 B2 | 11/2020 | Fountain, Jr. et al. |
| 10,854,578 B2 | 12/2020 | Morein |
| 10,879,212 B2 | 12/2020 | Uzoh et al. |
| 10,886,177 B2 | 1/2021 | DeLaCruz et al. |
| 10,892,246 B2 | 1/2021 | Uzoh |
| 10,923,408 B2 | 2/2021 | Huang et al. |
| 10,923,413 B2 | 2/2021 | DeLaCruz |
| 10,950,547 B2 | 3/2021 | Mohammed et al. |
| 10,964,664 B2 | 3/2021 | Mandalapu et al. |
| 10,985,133 B2 | 4/2021 | Uzoh |
| 10,991,804 B2 | 4/2021 | DeLaCruz et al. |
| 10,998,292 B2 | 5/2021 | Lee et al. |
| 11,004,757 B2 | 5/2021 | Katkar et al. |
| 11,011,494 B2 | 5/2021 | Gao et al. |
| 11,011,503 B2 | 5/2021 | Wang et al. |
| 11,031,285 B2 | 6/2021 | Katkar et al. |
| 11,056,348 B2 | 7/2021 | Theil |
| 11,088,099 B2 | 8/2021 | Katkar et al. |
| 11,127,738 B2 | 9/2021 | DeLaCruz et al. |
| 11,158,606 B2 | 10/2021 | Gao et al. |
| 11,171,117 B2 | 11/2021 | Gao et al. |
| 11,176,450 B2 | 11/2021 | Teig et al. |
| 11,256,004 B2 * | 2/2022 | Haba ................... G02B 27/14 |
| 11,264,357 B1 | 3/2022 | DeLaCruz et al. |
| 11,276,676 B2 | 3/2022 | Enquist et al. |
| 11,296,044 B2 | 4/2022 | Gao et al. |
| 11,329,034 B2 | 5/2022 | Tao et al. |
| 11,348,898 B2 | 5/2022 | DeLaCruz et al. |
| 11,355,443 B2 | 6/2022 | Huang et al. |
| 11,624,882 B2 | 4/2023 | Pezeshki et al. |
| 11,715,730 B2 | 8/2023 | Tao et al. |
| 11,762,200 B2 | 9/2023 | Katkar et al. |
| 11,860,415 B2 | 1/2024 | Huang et al. |
| 2002/0000328 A1 | 1/2002 | Motomura et al. |
| 2002/0003307 A1 | 1/2002 | Suga |
| 2002/0025101 A1 | 2/2002 | Kaatz |
| 2002/0131715 A1 | 9/2002 | Brady |
| 2003/0081906 A1 | 5/2003 | Filhaber et al. |
| 2003/0168716 A1 | 9/2003 | Lee et al. |
| 2004/0071424 A1 | 4/2004 | Hiraka et al. |
| 2004/0084414 A1 | 5/2004 | Sakai et al. |
| 2004/0149991 A1 | 8/2004 | Won |
| 2004/0155692 A1 | 8/2004 | Ochi |
| 2004/0157407 A1 | 8/2004 | Tong et al. |
| 2004/0207043 A1 | 10/2004 | Matsunaga et al. |
| 2004/0226910 A1 | 11/2004 | Chatterjee et al. |
| 2005/0063134 A1 | 3/2005 | Kim et al. |
| 2005/0063437 A1 | 3/2005 | Horng et al. |
| 2005/0135041 A1 | 6/2005 | Kang et al. |
| 2005/0190808 A1 | 9/2005 | Yonekura et al. |
| 2005/0226299 A1 | 10/2005 | Horng et al. |
| 2005/0231303 A1 | 10/2005 | Chang et al. |
| 2006/0012966 A1 | 1/2006 | Chakravorty |
| 2006/0017144 A1 | 1/2006 | Uematsu et al. |
| 2006/0057945 A1 | 3/2006 | Hsu et al. |
| 2006/0145778 A1 | 7/2006 | Pleva et al. |
| 2007/0045814 A1 | 3/2007 | Yamamoto et al. |
| 2007/0085165 A1 | 4/2007 | Oh et al. |
| 2007/0096130 A1 | 5/2007 | Schiaffino et al. |
| 2007/0096294 A1 | 5/2007 | Ikeda et al. |
| 2007/0111386 A1 | 5/2007 | Kim et al. |
| 2007/0147014 A1 | 6/2007 | Chang et al. |
| 2007/0222048 A1 | 9/2007 | Huang |
| 2007/0295456 A1 | 12/2007 | Gudeman et al. |
| 2008/0124835 A1 | 5/2008 | Chen et al. |
| 2008/0150821 A1 | 6/2008 | Koch et al. |
| 2009/0009103 A1 | 1/2009 | McKechnie et al. |
| 2009/0052827 A1 | 2/2009 | Durfee et al. |
| 2009/0165854 A1 | 7/2009 | Yamazaki et al. |
| 2009/0206962 A1 | 8/2009 | Chou et al. |
| 2009/0242252 A1 | 10/2009 | Tanaka |
| 2010/0317132 A1 | 12/2010 | Rogers et al. |
| 2011/0018657 A1 | 1/2011 | Cheng et al. |
| 2011/0024918 A1 | 2/2011 | Brunnbauer et al. |
| 2011/0059275 A1 | 3/2011 | Stark |
| 2011/0113828 A1 | 5/2011 | Matsumoto |
| 2011/0115579 A1 | 5/2011 | Rofougaran |
| 2011/0165707 A1 | 7/2011 | Lott et al. |
| 2011/0290552 A1 | 12/2011 | Palmateer et al. |
| 2011/0294242 A1 | 12/2011 | Lu |
| 2012/0013013 A1 | 1/2012 | Sadaka et al. |
| 2012/0013499 A1 | 1/2012 | Hayata |
| 2012/0100318 A1 | 4/2012 | Danzl et al. |
| 2012/0147516 A1 | 6/2012 | Kim et al. |
| 2012/0168217 A1 | 7/2012 | Hsu et al. |
| 2012/0189317 A1 | 7/2012 | Heck et al. |
| 2012/0212384 A1 | 8/2012 | Kam et al. |
| 2013/0009183 A1 | 1/2013 | Han |
| 2013/0009325 A1 | 1/2013 | Mori et al. |
| 2013/0020666 A1 | 1/2013 | Smith |
| 2013/0063863 A1 | 3/2013 | Timler et al. |
| 2013/0072011 A1 | 3/2013 | Zhang et al. |
| 2013/0083583 A1 | 4/2013 | Crisp et al. |
| 2013/0105943 A1 | 5/2013 | Lai et al. |
| 2013/0122617 A1 | 5/2013 | Lott et al. |
| 2013/0170145 A1 | 7/2013 | Gouramanis |
| 2013/0207234 A1 | 8/2013 | Ikeda et al. |
| 2013/0250430 A1 | 9/2013 | Robbins et al. |
| 2013/0265733 A1 | 10/2013 | Herbsommer et al. |
| 2013/0286544 A1 | 10/2013 | Azais |
| 2014/0001568 A1 | 1/2014 | Wang et al. |
| 2014/0048908 A1 | 2/2014 | Chen et al. |
| 2014/0071519 A1 | 3/2014 | Chen et al. |
| 2014/0116761 A1 | 5/2014 | Lee et al. |
| 2014/0145338 A1 | 5/2014 | Fujii et al. |
| 2014/0175629 A1 | 6/2014 | Sun et al. |
| 2014/0175655 A1 | 6/2014 | Chen et al. |
| 2014/0177189 A1 | 6/2014 | Liu et al. |
| 2014/0184351 A1 | 7/2014 | Bae et al. |

(56) References Cited

U.S. PATENT DOCUMENTS

| | | |
|---|---|---|
| 2014/0225795 A1 | 8/2014 | Yu |
| 2014/0252635 A1 | 9/2014 | Tran et al. |
| 2014/0264751 A1 | 9/2014 | Chen et al. |
| 2014/0264948 A1 | 9/2014 | Chou et al. |
| 2014/0294342 A1 | 10/2014 | Offriein et al. |
| 2014/0370658 A1 | 12/2014 | Tong et al. |
| 2014/0377946 A1 | 12/2014 | Cha et al. |
| 2015/0021626 A1 | 1/2015 | Nakamura et al. |
| 2015/0064498 A1 | 3/2015 | Tong |
| 2015/0097298 A1 | 4/2015 | Chen et al. |
| 2015/0179539 A1 | 6/2015 | Tamai |
| 2015/0194379 A1 | 7/2015 | Chen et al. |
| 2015/0206902 A1 | 7/2015 | Cheng et al. |
| 2015/0221571 A1 | 8/2015 | Chaparala et al. |
| 2015/0235952 A1 | 8/2015 | Pan et al. |
| 2015/0270209 A1 | 9/2015 | Woychik et al. |
| 2015/0318618 A1 | 11/2015 | Chen et al. |
| 2015/0328875 A1 | 11/2015 | Hattori et al. |
| 2016/0027765 A1 | 1/2016 | von Malm et al. |
| 2016/0070078 A1 | 3/2016 | Budd et al. |
| 2016/0077294 A1 | 3/2016 | Jou et al. |
| 2016/0111404 A1 | 4/2016 | Sanders et al. |
| 2016/0116673 A1 | 4/2016 | Budd et al. |
| 2016/0141469 A1 | 5/2016 | Robin et al. |
| 2016/0155677 A1 | 6/2016 | Bonart et al. |
| 2016/0181477 A1 | 6/2016 | Lee et al. |
| 2016/0197630 A1 | 7/2016 | Kawasaki |
| 2016/0233195 A1 | 8/2016 | Nagai |
| 2016/0254345 A1 | 9/2016 | Singh et al. |
| 2016/0291265 A1 | 10/2016 | Kinghorn et al. |
| 2016/0309578 A1 | 10/2016 | Park |
| 2016/0343682 A1 | 11/2016 | Kawasaki |
| 2016/0372449 A1 | 12/2016 | Rusu et al. |
| 2017/0019086 A1 | 1/2017 | Dueweke |
| 2017/0047312 A1 | 2/2017 | Budd et al. |
| 2017/0062409 A1 | 3/2017 | Basker et al. |
| 2017/0069609 A1 | 3/2017 | Zhang et al. |
| 2017/0148777 A1 | 5/2017 | Bono et al. |
| 2017/0179029 A1 | 6/2017 | Enquist et al. |
| 2017/0186670 A1 | 6/2017 | Budd et al. |
| 2017/0186730 A1 | 6/2017 | Shen et al. |
| 2017/0194271 A1 | 7/2017 | Hsu et al. |
| 2017/0207600 A1 | 7/2017 | Klamkin et al. |
| 2017/0213502 A1 | 7/2017 | Henry et al. |
| 2017/0315299 A1 | 11/2017 | Mathai et al. |
| 2017/0330858 A1 | 11/2017 | Lee et al. |
| 2017/0331050 A1 | 11/2017 | Yagi et al. |
| 2017/0338214 A1 | 11/2017 | Uzoh et al. |
| 2017/0343498 A1 | 11/2017 | Kalnitsky et al. |
| 2018/0074322 A1 | 3/2018 | Rousseau et al. |
| 2018/0120568 A1 | 5/2018 | Miller et al. |
| 2018/0156965 A1 | 6/2018 | El-Ghoroury et al. |
| 2018/0175012 A1 | 6/2018 | Wu et al. |
| 2018/0182639 A1 | 6/2018 | Uzoh et al. |
| 2018/0182666 A1 | 6/2018 | Uzoh et al. |
| 2018/0190580 A1 | 7/2018 | Haba et al. |
| 2018/0190583 A1 | 7/2018 | DeLaCruz et al. |
| 2018/0191047 A1 | 7/2018 | Huang et al. |
| 2018/0219038 A1 | 8/2018 | Gambino et al. |
| 2018/0261645 A1 | 9/2018 | Na et al. |
| 2018/0277523 A1 | 9/2018 | Ahmed et al. |
| 2018/0286805 A1 | 10/2018 | Huang et al. |
| 2018/0323177 A1 | 11/2018 | Yu et al. |
| 2018/0323227 A1 | 11/2018 | Zhang et al. |
| 2018/0331000 A1 | 11/2018 | DeLaCruz et al. |
| 2018/0331066 A1 | 11/2018 | Uzoh et al. |
| 2018/0358332 A1 | 12/2018 | Kim |
| 2019/0018245 A1 | 1/2019 | Cheng et al. |
| 2019/0088633 A1 | 3/2019 | Tao et al. |
| 2019/0096741 A1 | 3/2019 | Uzoh et al. |
| 2019/0115277 A1 | 4/2019 | Yu et al. |
| 2019/0131277 A1 | 5/2019 | Yang et al. |
| 2019/0198409 A1 | 6/2019 | Katkar et al. |
| 2019/0227320 A1 | 7/2019 | Bonar et al. |
| 2019/0265411 A1 | 8/2019 | Huang et al. |
| 2019/0287949 A1 | 9/2019 | Chong et al. |
| 2019/0309936 A1* | 10/2019 | Kondo .................... H01L 33/50 |
| 2019/0333550 A1 | 10/2019 | Fisch |
| 2019/0385935 A1 | 12/2019 | Gao et al. |
| 2019/0385966 A1 | 12/2019 | Gao et al. |
| 2020/0013637 A1 | 1/2020 | Haba |
| 2020/0013765 A1 | 1/2020 | Fountain, Jr. et al. |
| 2020/0035641 A1 | 1/2020 | Fountain, Jr. et al. |
| 2020/0043817 A1 | 2/2020 | Shen et al. |
| 2020/0075553 A1 | 3/2020 | DeLaCruz et al. |
| 2020/0118973 A1 | 4/2020 | Wang et al. |
| 2020/0126906 A1 | 4/2020 | Uzoh et al. |
| 2020/0194396 A1 | 6/2020 | Uzoh |
| 2020/0194614 A1 | 6/2020 | Pares |
| 2020/0194635 A1 | 6/2020 | Yuasa et al. |
| 2020/0218009 A1 | 7/2020 | Preston et al. |
| 2020/0227367 A1 | 7/2020 | Haba et al. |
| 2020/0235085 A1 | 7/2020 | Tao et al. |
| 2020/0243380 A1 | 7/2020 | Uzoh et al. |
| 2020/0279821 A1 | 9/2020 | Haba et al. |
| 2020/0294908 A1 | 9/2020 | Haba et al. |
| 2020/0321307 A1 | 10/2020 | Uzoh |
| 2020/0328162 A1 | 10/2020 | Haba et al. |
| 2020/0328164 A1 | 10/2020 | DeLaCruz et al. |
| 2020/0328165 A1 | 10/2020 | DeLaCruz et al. |
| 2020/0335408 A1 | 10/2020 | Gao et al. |
| 2020/0365575 A1 | 11/2020 | Uzoh et al. |
| 2020/0371154 A1 | 11/2020 | DeLaCruz et al. |
| 2020/0395321 A1 | 12/2020 | Katkar et al. |
| 2020/0411483 A1 | 12/2020 | Uzoh et al. |
| 2020/0411587 A1 | 12/2020 | Pezeshki et al. |
| 2021/0098412 A1 | 4/2021 | Haba et al. |
| 2021/0118853 A1 | 4/2021 | Harris et al. |
| 2021/0118864 A1 | 4/2021 | DeLaCruz et al. |
| 2021/0143125 A1 | 5/2021 | DeLaCruz et al. |
| 2021/0151408 A1 | 5/2021 | Yu et al. |
| 2021/0181510 A1 | 6/2021 | Katkar et al. |
| 2021/0193603 A1 | 6/2021 | Katkar et al. |
| 2021/0193624 A1 | 6/2021 | DeLaCruz et al. |
| 2021/0193625 A1 | 6/2021 | DeLaCruz et al. |
| 2021/0242152 A1 | 8/2021 | Fountain, Jr. et al. |
| 2021/0265331 A1 | 8/2021 | Wang et al. |
| 2021/0288037 A1 | 9/2021 | Tao et al. |
| 2021/0296282 A1 | 9/2021 | Gao et al. |
| 2021/0305202 A1 | 9/2021 | Uzoh et al. |
| 2021/0366820 A1 | 11/2021 | Uzoh |
| 2021/0407941 A1 | 12/2021 | Haba |
| 2022/0043209 A1 | 2/2022 | Huang et al. |
| 2022/0077063 A1 | 3/2022 | Haba |
| 2022/0077087 A1 | 3/2022 | Haba |
| 2022/0139867 A1 | 5/2022 | Uzoh |
| 2022/0139869 A1 | 5/2022 | Gao et al. |
| 2022/0208650 A1 | 6/2022 | Gao et al. |
| 2022/0208702 A1 | 6/2022 | Uzoh |
| 2022/0208723 A1 | 6/2022 | Katkar et al. |
| 2022/0246497 A1 | 8/2022 | Fountain, Jr. et al. |
| 2022/0285303 A1 | 9/2022 | Mirkarimi et al. |
| 2022/0319901 A1 | 10/2022 | Suwito et al. |
| 2022/0320035 A1 | 10/2022 | Uzoh et al. |
| 2022/0320036 A1 | 10/2022 | Gao et al. |
| 2023/0005850 A1 | 1/2023 | Fountain, Jr. |
| 2023/0019869 A1 | 1/2023 | Mirkarimi et al. |
| 2023/0036441 A1 | 2/2023 | Haba et al. |
| 2023/0067677 A1 | 3/2023 | Lee et al. |
| 2023/0069183 A1 | 3/2023 | Haba |
| 2023/0100032 A1 | 3/2023 | Haba et al. |
| 2023/0115122 A1 | 4/2023 | Uzoh et al. |
| 2023/0122531 A1 | 4/2023 | Uzoh |
| 2023/0123423 A1 | 4/2023 | Gao et al. |
| 2023/0125395 A1 | 4/2023 | Gao et al. |
| 2023/0130259 A1 | 4/2023 | Haba et al. |
| 2023/0132632 A1 | 5/2023 | Katkar et al. |
| 2023/0140107 A1 | 5/2023 | Uzoh et al. |
| 2023/0142680 A1 | 5/2023 | Guevara et al. |
| 2023/0154816 A1 | 5/2023 | Haba et al. |
| 2023/0154828 A1 | 5/2023 | Haba et al. |
| 2023/0161120 A1 | 5/2023 | Yu et al. |
| 2023/0187264 A1 | 6/2023 | Uzoh et al. |
| 2023/0187317 A1 | 6/2023 | Uzoh |

(56) References Cited

U.S. PATENT DOCUMENTS

| | | |
|---|---|---|
| 2023/0187412 A1 | 6/2023 | Gao et al. |
| 2023/0197453 A1 | 6/2023 | Fountain, Jr. et al. |
| 2023/0197496 A1 | 6/2023 | Theil |
| 2023/0197559 A1 | 6/2023 | Haba et al. |
| 2023/0197560 A1 | 6/2023 | Katkar et al. |
| 2023/0197655 A1 | 6/2023 | Theil et al. |
| 2023/0207402 A1 | 6/2023 | Fountain, Jr. et al. |
| 2023/0207437 A1 | 6/2023 | Haba |
| 2023/0207474 A1 | 6/2023 | Uzoh et al. |
| 2023/0207514 A1 | 6/2023 | Gao et al. |
| 2023/0215836 A1 | 7/2023 | Haba et al. |
| 2023/0245950 A1 | 8/2023 | Haba et al. |
| 2023/0268300 A1 | 8/2023 | Uzoh et al. |
| 2023/0299029 A1 | 9/2023 | Theil et al. |
| 2023/0317703 A1 | 10/2023 | Tao et al. |
| 2023/0343734 A1 | 10/2023 | Uzoh et al. |
| 2024/0063199 A1 | 2/2024 | Tao et al. |
| 2024/0118492 A1 | 4/2024 | Huang et al. |

FOREIGN PATENT DOCUMENTS

| | | |
|---|---|---|
| JP | 60-257413 A | 12/1985 |
| JP | 10-189671 A | 7/1998 |
| JP | 2000-100679 | 4/2000 |
| JP | 2001-102479 | 4/2001 |
| JP | 2002-353416 | 6/2002 |
| JP | 2003-043281 | 2/2003 |
| JP | 2005086044 A | 3/2005 |
| JP | 2005123522 A | 5/2005 |
| JP | 2006276313 A | 10/2006 |
| JP | 2007041117 A | 2/2007 |
| JP | 2008-258258 | 10/2008 |
| JP | 2010276940 A | 12/2010 |
| JP | 2013-33786 | 2/2013 |
| JP | 2017-177519 | 10/2017 |
| JP | 2018-160519 | 10/2018 |
| JP | 2019192888 A | 10/2019 |
| KR | 10-2006-0105797 | 10/2006 |
| KR | 10-2015-0097798 | 8/2015 |
| WO | WO 02/075387 A2 | 9/2002 |
| WO | WO2005043584 | 5/2005 |
| WO | WO 2005/064646 A2 | 7/2005 |
| WO | WO 2006/100444 A1 | 9/2006 |
| WO | WO 2012/125237 A2 | 9/2012 |
| WO | WO 2016/057259 A1 | 4/2016 |
| WO | WO 2017/089676 A1 | 6/2017 |
| WO | WO 2017/151442 A1 | 9/2017 |
| WO | WO 2018/223150 A1 | 12/2018 |
| WO | WO 2019/143413 A1 | 7/2019 |

OTHER PUBLICATIONS

Bajwa, Rayan et al., "Integrated on-chip transformers: Recent progress in the design, layout, modeling and fabrication," Sensors, 2019, vol. 19, pp. 3535-3559.

Chung et al., "Room temperature GaAseu + Si and InPeu + Si wafer direct bonding by the surface activate bonding method," Nuclear Instruments and Methods in Physics Research Section B: Beam Interactions with Materials and Atoms, Jan. 2, 1997, vol. 121, Issues 1-4, pp. 203-206.

Chung et al., "Wafer direct bonding of compound semiconductors and silicon at room temperature by the surface activated bonding method," Applied Surface Science, Jun. 2, 1997, vols. 117-118, pp. 808-812.

Farrens et al., "Chemical free room temperature wafer to wafer direct bonding," J. Electrochem. Soc., The Electrochemical Society, Inc., Nov. 1995, vol. 142, No. 11. pp. 3949-3955.

Farrens et al., "Chemical free wafer bonding of silicon to glass and sapphire," Electrochemical Society Proceedings vol. 95-7, 1995, pp. 72-77.

Gösele et al., "Semiconductor Wafer Bonding: A flexible approach to materials combinations in microelectronics; micromechanics and optoelectronics," IEEE, 1997, pp. 23-32.

Hosoda et al., "Effect of the surface treatment on the room-temperature bonding of Al to Si and SiO2," Journal of Materials Science, Jan. 1, 1998, vol. 33, Issue 1, pp. 253-258.

Hosoda et al., "Room temperature GaAs—Si and InP—Si wafer direct bonding by the surface activated bonding method," Nuclear Inst. And Methods in Physics Research B, 1997, vol. 121, Nos. 1-4, pp. 203-206.

Howlader et al., "A novel method for bonding of ionic wafers," Electronics Components and Technology Conference, 2006, IEEE, pp. 7-pp.

Howlader et al., "Bonding of p. Si/n-InP wafers through surface activated bonding method at room temperature," Indium Phosphide and Related Materials, 2001, IEEE International Conference on, pp. 272-275.

Howlader et al., "Characterization of the bonding strength and interface current of p. Si/ n-InP wafers bonded by surface activated bonding method at room temperature," Journal of Applied Physics, Mar. 1, 2002, vol. 91, No. 5, pp. 3062-3066.

Howlader et al., "Investigation of the bonding strength and interface current of p- SionGaAs wafers bonded by surface activated bonding at room temperature," J. Vac. Sci. Technol. B 19, Nov./Dec. 2001, pp. 2114-2118.

International Search Report and Written Opinion mailed Jan. 9, 2018, issued in International Application No. PCT/US2017/052409, 16 pages.

International Search Report and Written Opinion mailed Mar. 22, 2018, issued in International Application No. PCT/US2017/064735, 13 pages.

International Search Report and Written Opinion mailed Jul. 17, 2018, issued in International Application No. PCT/US2018/025241, 15 pages.

Itoh et al., "Characteristics of fritting contacts utilized for micromachined wafer probe cards," 2000 American Institute of Physics, AIP Review of Scientific Instruments, vol. 71, 2000, pp. 2224.

Itoh et al., "Characteristics of low force contact process for MEMS probe cards," Sensors and Actuators A: Physical, Apr. 1, 2002, vols. 97-98, pp. 462-467.

Itoh et al., "Development of MEMS IC probe card utilizing fritting contact," Initiatives of Precision Engineering at the Beginning of a Millennium: 10th International Conference on Precision Engineering (ICPE) Jul. 18-20, 2001, Yokohama, Japan, 2002, Book Part 1, pp. 314-318.

Itoh et al., "Room temperature vacuum sealing using surface activated bonding method," The 12th International Conference on Solid State Sensors, Actuators and Microsystems, Boston, Jun. 8-12, 2003, 2003 IEEE, pp. 1828-1831.

Jeon, Y. et al., "Design of an on-interposer passive equalizer for high bandwidth memory (HBM) with 30Gbps data transmission," Electronic Components and Technology Conference (ECTC), 2016 IEEE 66th, Aug. 18, 2016.

Kim et al., "Low temperature direct Cu—Cu bonding with low energy ion activation method," Electronic Materials and Packaging, 2001, IEEE, pp. 193-195.

Kim et al., "Room temperature Cu—Cu direct bonding using surface activated bonding method," J. Vac. Sci. Technol., 2003 American Vacuum Society, Mar/Apr. 2003, vol. 21, No. 2, pp. 449-453.

Kim et al., "Wafer-scale activated bonding of Cu—CU, Cu—Si, and Cu—SiO2 at low temperature," Proceedings—Electrochemical Society, 2003, vol. 19, pp. 239-247.

Kim, H. et al., "A wideband on-interposer passive equalizer design for chip-to-chip 30-GB/s serial data transmission," IEEE Transactions on Components, Packaging and Manufacturing Technology, Jan. 2015, vol. 5, Issue 1, pp. 28-39.

Lee, H. et al., "Signal integrity of bump-less high-speed through silicon via channel for terabyte/s bandwidth 2.5D IC," 2016 IEEE 66th Electronic Components and Technology Conference, Aug. 18, 2016.

Matsuzawa et al., "Room-temperature interconnection of electroplated Au microbump by means of surface activated bonding method," Electornic Components and Technology Confererence, 2001, 51st Proceedings, IEEE, pp. 384-387.

(56) References Cited

OTHER PUBLICATIONS

Onodera et al., "The effect of prebonding heat treatment on the separability of Au wire from Ag-plated Cu alloy substrate," Electronics Packaging Manufacturing, IEEE Transactions, Jan. 2002, vol. 25, Issue 1, pp. 5-12.
Reiche et al., "The effect of a plasma pretreatment on the Si/Si bonding behaviouir," Electrochemical Society Proceedings, 1998, vol. 97-36, pp. 437-444.
Roberds et al., "Low temperature, in situ, plasma activated wafer bonding," Electrochecmical Society Proceedings, 1997, vol. 97-36, pp. 598-606.
Shigetou et al., "Room temperature bonding of ultra-fine pitch and low-profiled Cu electrodes for bump-less interconnect," 2003 Electronic Components and Technology Conference, pp. 848-852.
Shigetou et al., "Room-temperature direct bonding of CMP-Cu film for bumpless interconnection," Electronic Components and Technology Confererence, 51st Proceedings, 2001, IEEE, pp. 755-760.
Shingo et al., "Design and fabrication of an electrostatically actuated MEMS probe card," Tranducers, Solid-State Sensors, Actuators and Microsystems, 12th International Conference, Jun. 8-12, 2003, vol. 2, pp. 1522-1525.
Suga et al., "A new approach to Cu—Cu direct bump bonding, IEMT/IMC Symposium, 1997, Joint International Electronic Manufacturing Symposium and the International Microelectronics Conference," Apr. 16-18, 1997, IEEE, pp. 146-151.
Suga et al., "A new bumping process using lead-free solder paste," Electronics Packaging Manufacturing, IEEE Transactions on (vol. 25, Issue 4), IEEE, Oct. 2002, pp. 253-256.
Suga et al., "A new wafer-bonder of ultra-high precision using surface activated bonding (SAB) concept," Electronic Components and Technology Conference, 2001, IEEE, pp. 1013-1018.
Suga, T., "Feasibility of surface activated bonding for ultra-fine pitch interconnection—A new concept of bump-less direct bonding for system level packaging," The University of Tokyo, Research Center for Science and Technology, 2000 Electronic Components and Technology Conference, 2000 IEEE, pp. 702-705.
Suga, T., "Room-temperature bonding on metals and ceramics," Proceedings of the Second International Symposium on Semiconductor Wafer Bonding: Science, Technology and Applications, The Electrochemical Society Proceedings, vol. 93-29 (1993), pp. 71-80.
Suga et al., "Surface activated bonding—an approach to joining at room temperature," Ceramic Transactions: Structural Ceramics Joining II, The American Ceramic Society, 1993, pp. 323-331.
Suga et al., "Surface activated bonding for new flip chip and bumpless interconnect systems," Electronic Components and Technology Conference, 2002, IEEE, pp. 105-111.
Suga, "UHV room temperature joining by the surface activated bonding method," Advances in science and technology, Techna, Faenza, Italie, 1999, pp. C1079-C1089.
Takagi et al., "Effect of surface roughness on room-temperature wafer bonding by Ar beam surface activation," Japanese Journal of Applied Physics, 1998, vol. 37, Part 1, No. 1, pp. 4197.
Takagi et al., "Low temperature direct bonding of silicon and silicon dioxide by the surface activation method," Solid State Sensors and Actuators, 1997, Transducers '97 Chicago, 1997 International Conference, vol. 1, pp. 657-660.
Takagi et al., "Room-temperature bonding of lithium niobate and silicon wafers by argon-beam surface activation," Appl. Phys. Lett., 1999. vol. 74, pp. 2387.
Takagi et al., "Room temperature silicon wafer direct bonding in vacuum by Ar beam irradiation," Micro Electro Mehcanical Systems, MEMS '97 Proceedings, 1997, IEEE, pp. 191-196.
Takagi et al., "Room-temperature wafer bonding of Si to LiNbO3, LiTaO3 and Gd3Ga5O12 by Ar-beam surface activation," Journal of Micromechanics and Microengineering, 2001, vol. 11, No. 4, pp. 348.
Takagi et al., "Room-temperature wafer bonding of silicon and lithium niobate by means of arbon-beam surface activation," Integrated Ferroelectrics: An International Journal, 2002, vol. 50, Issue 1, pp. 53-59.

Takagi et al., "Surface activated bonding silicon wafers at room temperature," Appl. Phys. Lett. 68, 2222 (1996).
Takagi et al, "Wafer-scale room-temperature bonding between silicon and ceramic wafers by means of argon-beam surface activation," Micro Electro Mechanical Systems, 2001, MEMS 2001, The 14th IEEE International Conference, Jan. 25, 2001, IEEE, pp. 60-63.
Takagi et al., "Wafer-scale spontaneous bonding of silicon wafers by argon-beam surface activation at room temperature," Sensors and Actuators A: Physical, Jun. 15, 2003, vol. 105, Issue 1, pp. 98-102.
Tong et al., "Low temperature wafer direct bonding, Journal of Microelectomechanical systems," Mar. 1994, vol. 3, No. 1, pp. 29-35.
Topol et al., "Enabling technologies for wafer-level bonding of 3D MEMS and integrated circuit structures," 2004 Electronics Components and Technology Conference, 2004 IEEE, pp. 931-938.
Wang et al., "Reliability and microstructure of Au—Al and Au—Cu direct bonding fabricated by the Surface Activated Bonding," Electronic Components and Technology Conference, 2002, IEEE, pp. 915-919.
Wang et al., "Reliability of Au bump—Cu direct interconnections fabricated by means of surface activated bonding method," Microelectronics Reliability, May 2003, vol. 43, Issue 5, pp. 751-756.
Weldon et al., "Physics and chemistry of silicon wafer bonding investigated by infrared absorption spectroscopy," Journal of Vacuum Science & Technology B, Jul./Aug. 1996, vol. 14, No. 4, pp. 3095-3106.
Westphal, W.B. et al., "Dielectric constant and loss data," Air Force Materials Laboratory, Apr. 1972.
Xu et al., "New Au—Al interconnect technology and its reliability by surface activated bonding," Electronic Packaging Technology Proceedings, Oct. 28-30, 2003, Shanghai, China, pp. 479-483.
Ceramic Microstructures: Control at the Atomic Level, Recent Progress in Surface Activated Bonding, 1998, pp. 385-389.
Ker, Ming-Dou et al., "Fully Process-Compatible Layout Design on Bond Pad to Improve Wire Bond Reliability in CMOS ICs," IEEE Transactions on Components and Packaging Technologies, Jun. 2002, vol. 25, No. 2, pp. 309-316.
Moriceau, H. et al., "Overview of Recent Direct Wafer Bonding Advances and Applications", Advances in Natural Sciences-Nanoscience and Nanotechnology, 2010, 12 pages.
Nakanishi, H. et al., "Studies on SiO2—SiO2 Bonding with Hydrofluoric Acid. Room Temperature and Low Stress Bonding Technique for MEMS," Tech. Research Lab., 200, Elsevier Science S.A., 8 pages.
Office Action for U.S. Appl. No. 16/176,191, mailed on Jan. 25, 2021, Haba, "Direct-Bonded Lamination for Improved Image Clarity in Optical Devices", 8 Pages.
Office Action for U.S. Appl. No, 16/176,191, mailed on Apr. 30, 2021, Haba, "Direct-Bonded Lamination for Improved Image Clarity in Optical Devices", 7 Pages.
Office Action for U.S. Appl. No. 16/176,191, mailed on Jul. 10, 2020, Haba, "Direct-Bonded Lamination for Improved Image Clarity in Optical Devices ", 9 pages.
Oberhammer et al., "Sealing of Adhesive Bonded Devices on Wafer Level," in Sensors and Actuators A, vol. 110, No. 1-3, pp. 407-412, Feb. 29, 2004, see pp. 407-412; and figures 1(a)-1(I), 6 pages.
Plobi et al., "Wafer Direct Bonding: Tailoring Adhesion Between Brittle Materials," Materials Science and Engineering Review Journal, 1999, 88 pages.
Suga et al., "Bump-less Interconnect for Next Generation System Packaging," IEEE (2001) and ECTC 2001, 6 pages.
WO2020028080 Search Report and Written Opinion, Jul. 2019, 9 pages.
Japan Office Action mailed Nov. 28, 2022, Japanese Patent Applicatio No. 2020-550769, with English translation, 12 pages.
Absen, "Analysis of micro LED large screen display technology—Chip and encapsulation structure", Jan. 26, 2022; downloaded from https://www.absen.com/analysis-of-micro-led-large-screen-display-technology-chip-and-encapsulation-structure/; Oct. 9, 2024; 13 pages.
Avicena Tech Corp., "Avicena Raises $25 Million in Series A to Fund Development of High Capacity microLED-based Optical

(56) References Cited

OTHER PUBLICATIONS

Interconnects", Press Release: Aug. 2, 2022, https://avicena.tech/press-release-08-02 2022/, 4 pages.

Bush, Steve, "Electronica: Automotive power modules from On Semi," ElectronicsWeekly.com, indicating an ONSEMI AR0820 product was to be demonstrated at a Nov. 2018 trade show, https://www.electronicsweekly.com/news/products/power-supplies/electronica-automotive-power-modules-semi-2018-11/ (published Nov. 8, 2018; downloaded Jul. 26, 2023).

Gordillo O.A.J. et al., "Plug-and-play fiber to waveguide connector", Optics express. Jul. 22, 2019;27(15): 20305-10.

Ingle et al., "Chipworks shows Samsung ISOCELL cross-section," Apr. 1, 2014; publ. in Image Sensors World Blog; downloaded from httml://image-sensors-world.blogspot.com/2014/04/chipworks-shows-samsung-isocell-cross.html; on Oct. 9, 2024; 8 pages.

Jasim et al., "The effect of reflectivity on vcsel output performance," Int J Nanoelectronics & Materials. 2011 Jan1;4: 65-72.

Liu et al., "A review on micro-LED display integrating metasurface structures." Micromachines. Jun. 30, 2023;14(7): 1354 in 18 pages.

Morgan T.P., "Nvidia Shows What Optically Linked GPU Systems might look like", The Next Platform, Aug. 17, 2022; https://www.nextplatform.com/2022/08/17/nvidia-shows-what-optically-linked-gpu-systems-might-look-like/, 13 pages.

Morrison, Jim et al., "Samsung Galaxy S7 Edge Teardown," Tech Insights (posted Apr. 24, 2016), includes description of hybrid bonded Sony IMX260 dual-pixel sensor, https://www.techinsights.com/blog/samsung-galaxy-s7-edge-teardown, downloaded Jul. 11, 2023, 9 pages.

ONSEMI AR0820 image, cross section of a CMOS image sensor product. The part in the image was shipped on Sep. 16, 2021. Applicant makes no representation that the part in the image is identical to the part identified in the separately submitted reference BUSH, Nov. 8, 2018, ElectronicsWeekly.com ("BUSH article"); however, the imaged part and the part shown in the BUSH article share the part number "ONSEMI AR0820."

Manda et al., "High-definition Visible-SWIR InGaAs Image Sensor using Cu—Cu Bonding of III-V to Silicon Wafer," in2019 IEEE International Electron Devices Meeting (IEDM) Dec. 7, 2019 (pp. 16-17); DOI: 10.1109/IEDM19573.2019.8993432.

Samsung, "LED (Light Emitting Diode}", published Feb. 6, 2013; downloaded from https://semiconductor.samsung.com/support/tools-resources/dictionary/semiconductor-glossary-leds/ on Oct. 9, 2024, 2 pages.

Sony IMX260 images, showing various cross sections and materials analyses for a hybrid bonded back side illuminated CMOS image sensor. The part in the images was shipped in Apr. 2016. Applicant makes no representation that the part in the images is identical to the part identified in the separately submitted reference Morrison et al. (Tech Insights article dated Apr. 24, 2016), describing and showing a similar sensor product within the Samsung Galaxy S7; however the imaged part and the part shown in the Morrison et al. article share the part name "Sony IMX260 image." (8 pages).

Zhang et al., "Distributed Bragg reflectors for GaN-based vertical-cavity surface-emitting lasers." Applied Sciences. Apr. 17, 2019;9(8):1593; 15 pages.

Zhang et al., "Degradation characteristics and mechanism of high speed 850 nm vertical-cavity surface-emitting laser during accelerated aging." Photonics. Oct. 26, 2022; 9(11): 801 in 13 pages.

Zhou et al., GaN-based flip-chip LEDs with highly reflective ITO/DBR p-type and via hole-based n-type contacts for enhanced current spreading and light extraction. Opt Laser Technol. Jul. 1, 2017;92: 95-100.

\* cited by examiner

DIRECT-BONDED LAMINATION FOR IMPROVED IMAGE CLARITY IN OPTICAL DEVICES

RELATED APPLICATIONS

This application claims priority to U.S. patent application Ser. No. 16/176,191, filed Oct. 31, 2018, which claims priority to U.S. Patent Application No. 62/645,633, field Mar. 20, 2018, which are incorporated herein by reference.

BACKGROUND

Optical components often include optical layers in various laminated combinations of glass, reflective metal, transparent polymer, dielectric, and adhesive. The adhesives between joined or laminate layers serve no optical purpose per se, but their presence is taken for granted even though they detrimentally introduce additional materials into the light path. Each additional change of material in the light path introduces some kind of image loss, such as loss of brightness or loss of resolution. This loss of image quality may be due to simple scattering of the light at each new interface, due to partial absorption of light by the adhesive materials or may be due to changes in the angles of refraction between materials, or both.

The amount by which light slows in a given material is described by its index of refraction. The index of refraction of a material is defined by the speed of light in vacuum c divided by the speed of light through the material. Optically dense media have large indices of refraction. In optical apparatuses, different types of glasses, polymers, ceramics, such as transparent spinel, and optical adhesives may have slightly different indices of refraction. Thus, when light speeds up as it passes from one material to another, or vice versa when light slows down between materials, the angle of refraction is larger (or smaller) than the angle of incidence, causing some image loss or distortion along the light path. Although thin, the adhesive layers between transparent materials in an optical device take away some of the perfection an image might have had for a human viewer.

Smartglasses and head-up displays (HUDs) for augmented reality (AR) and virtual reality (VR) devices rely on numerous optical components, such as waveguides, prisms, collimators, convex lenses, reflectors, concave mirrors, combiners, and beam splitters to achieve near-eye optics in the smartglasses, and visual fusion in the head-up displays. Since the light path goes through many laminated optical components, the detrimental effects of conventional adhesive layers are compounded.

SUMMARY

Directly bonded lamination for improved image clarity in smartglasses and other optical devices is provided. An example process planarizes and plasma-activates optical surfaces to be laminated together, then forms direct bonds between the two surfaces without an adhesive or adhesive layer. This process provides improved optics with higher image brightness, less light scattering, better resolution, and higher image fidelity. The direct bonds also provide a refractory interface tolerant of much higher temperatures than conventional optical adhesives. The example process can be used to produce many types of improved optical components, such as improved laminated lenses, mirrors, beam splitters, collimators, prism systems, optical conduits, and mirrored waveguides for smartglasses and head-up displays (HUDs), which provide better image quality and elimination of the dark visual lines that are apparent to a human viewer when conventional adhesives are used in conventional lamination.

This summary is not intended to identify key or essential features of the claimed subject matter, nor is it intended to be used as an aid in limiting the scope of the claimed subject matter.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

DESCRIPTION

This disclosure describes direct bonded lamination for improved clarity in optical devices. In an implementation, example direct bonding techniques aim to minimize or eliminate optical adhesives and glues between optical layers, which can cause loss of image quality in optical devices.

In an implementation, direct oxide bonding between surfaces, such as silicon oxide to silicon oxide bonding, or direct bonding between surfaces with other semiconductor-nonmetal combinations is used to join or laminate optical layers made of glass or other materials, for optical precision. Besides silicone dioxide, other materials may be used for direct bonding, such as silicon nitride ($Si_3N_4$), silicon oxynitride (SiON), silicon carbonitride (SiCN), and other compounds. Elimination of a separate adhesive, or adhesive layer, between surfaces of optical layers improves optical performance, such as higher fidelity of light transmission. The direct bonds between optical surfaces also provide a refractory interface between the first optical surface and the second optical surface that improves the thermal budget of the overall optical component. The glues and adhesives conventionally used to attach two glass pieces together, for example, deteriorate at higher temperature or when used for certain wavelengths of light, certain light intensities, and with high power lasers, hence these conventional optical components that include conventional adhesives are limited to lower operating temperatures and to low power lasers. The direct bonding processes described herein, such as ZiBond® brand direct bonding, eliminates this conventional constraint. The direct bond that incidentally provides the refractory interface has the same coefficient of thermal expansion as one or both of the flat optical surfaces being joined together, and the direct bond providing the refractory interface also has a much higher resistance to heat and a higher resistance to elevated temperatures than conventional optical glues and adhesives.

The example bonding techniques can leave a minimal interface, or in some cases, no interface at all between optical layers when the molecules between two face-to-face surfaces made of the same material have been direct bonded to each other. The elimination of the adhesive, even if only a few microns thick, may reduce visual artifacts during use of some devices, such as the prominence of vertical lines visible to a user of conventional near-eye optics. For example, an example method applies direct bonding to improve a variety of basic waveguides used for near-eye optics in smartglasses and HUDs, which have reflective mirror surfaces at intervals within the waveguide.

Figure 1:
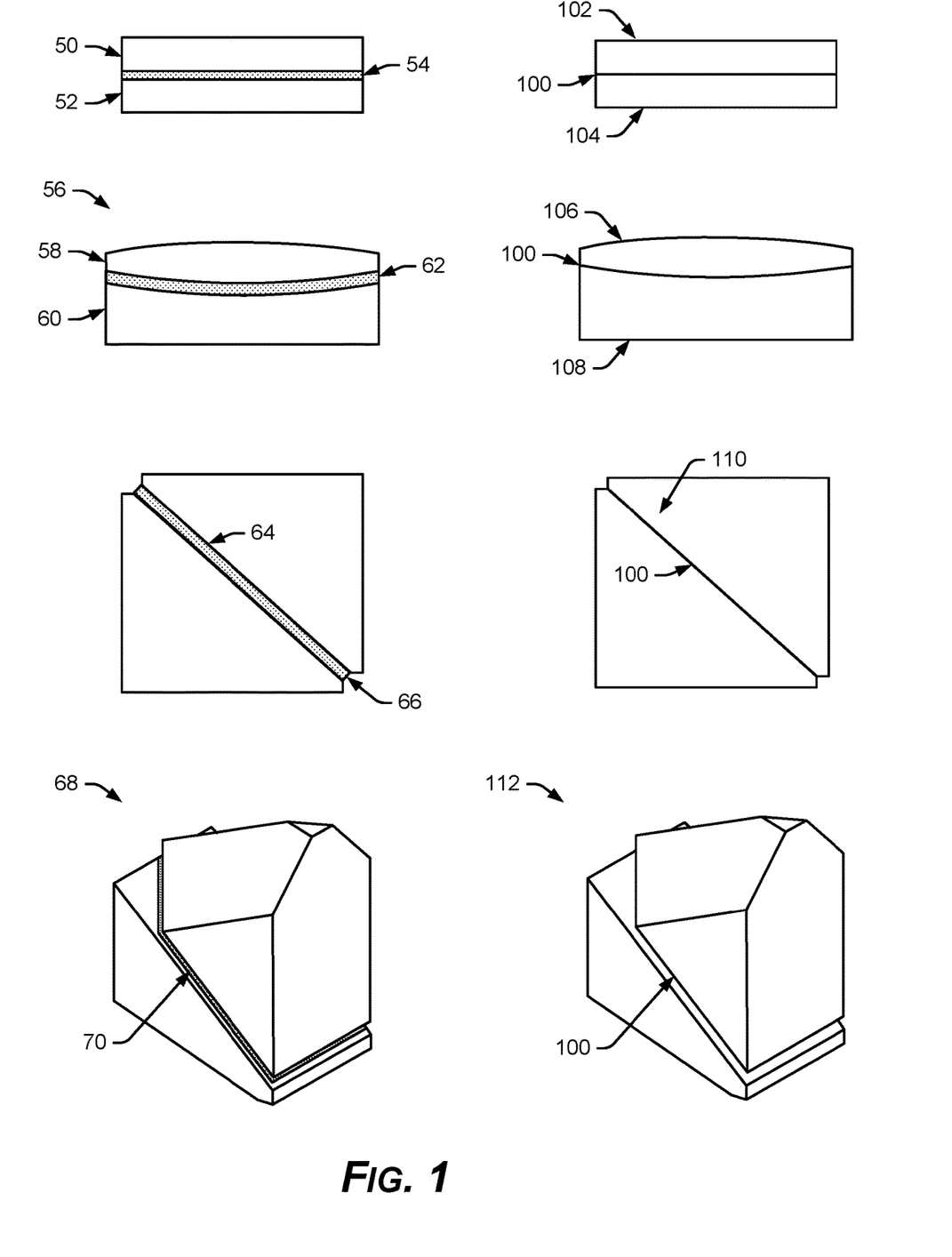
FIG. 1 is a diagram of joined optical components, showing example components with direct-bonded optical layers for optical clarity versus conventional components joined by adhesive layers.

FIG. 1 shows example optical components with surfaces direct-bonded together, instead of cemented together. Two optical blanks 50 & 52 are conventionally adhered together with an adhesive or an intervening adhesive layer 54. A direct bonding interface 100 may join comparable optical blanks 102 & 104, providing improved optical characteristics, due to the absence of the interfering and optically detrimental adhesive layer 54, found in the conventionally joined blanks 50 & 52.

An achromatic lens, such as an achromatic doublet 56, consisting of a convex element 58 and a concave element 60, are conventionally adhered together with a cement 62. The achromatic lenses are corrected to bring two wavelengths, such as blue and red, into focus on the same plane. The convex element 58 and a concave element 60 in the achromatic doublet are usually made of different glasses with different dispersions, such as crown glass and flint glass. The chromatic aberration of one lens 58 is counterbalanced by the chromatic aberration of the other lens 60. Conventional designs seek to minimize the effects of the presence of the conventional cement 62 on calculating the corrections for chromatic and spherical aberrations, by keeping cement layer as thin as possible, and with refractive characteristics compatible with crown glass and flint glass.

A direct bonding interface 100 may join comparable achromatic lens elements 106 & 108 without an intervening conventional cement 62, even though the glass materials for the optical elements being joined are made of molecularly different materials (crown glass and fling glass). The direct bonding interface 100 provides a better achromatic doublet than those made with conventional cements 62.

Likewise, partially mirrored, partially reflective surfaces 64, which also partially transmit incoming light, are used in beam splitters, near-eye optics, and in many other devices, such as interferometers. Beam splitters can be two triangular glass prisms glued together with epoxy, polyester, or a urethane-based adhesive. Thickness of the adhesive layer 66 can be calculated to reflect half the incident light and transmit the other half of the incident light in different directions. Some beam splitters may use a glass or plastic with sputtered aluminum or silver from vapor as a half-silvered mirror coating. A dichroic optical coating may also be used in beam splitters, for laser output or to split off certain wavelengths. The ratio of reflection versus transmission of light depends on the wavelengths of the incident light. Conventional designs may try to incorporate the properties of an adhesive layer 66 into the partially reflective surface 64. An example direct bonding interface 100 can remove the obstacles posed by an adhesive layer 66 in some circumstances. An example direct bonding interface 100 may provide a simpler and more precise partially reflective surface 110 for beam splitters and other optical devices, which can simplify manufacture and eliminate unwanted absorption of light by the conventional adhesive layer 66. The direct bonding interface 100 can eliminate the perception of bands or dark lines in optical devices that use stacked mirrored surfaces by including with partially reflective surfaces 110 that have optically pure interfaces because of the direct bonding interface 100.

Prism systems, such as pairs of Porro prisms in binoculars, or roof prisms, such as Schmidt-Pechan prisms 68, may conventionally use an adhesive interface 70 or may use an air interface, to avoid using the conventional adhesive interface 70. An example direct bonding interface 100, by comparison, can provide a better combination of prisms 12, with a truly transparent interface or no interface at all between direct-bonded surfaces of the same glass material.

The direct bonding interface 100 may also be used to implement other types of layers and coatings in a layered optical component. Often, entry and exit surfaces are optically coated to minimize light loss and a given coating may have good anti-reflective properties or good reflective properties. The example direct bonding interfaces 100 are especially useful for internal reflective (mirrored) and anti-reflective coatings implemented between layers of glass and laminate stacks of coated elements.

The example direct bonding interface 100 also provides superior optics when a dielectric coating is employed, rather than a metallic mirror coating. The example direct bonding interface 100 can provide laminate stacks of multiple dielectric mirrors, providing much better reflectivity of visible light than either aluminum or silver metal coatings.

The example direct-bond joining and lamination methods can be applied to many generic and specialized optical elements and devices to supersede and replace conventional techniques and conventional materials for bonding optical elements together, such as polyesters, epoxies, urethanes, resin adhesives, Canada Balsam, and other one and two component adhesives 54 & 62 & 66 & 70 for bonding optical elements.

Figure 2:
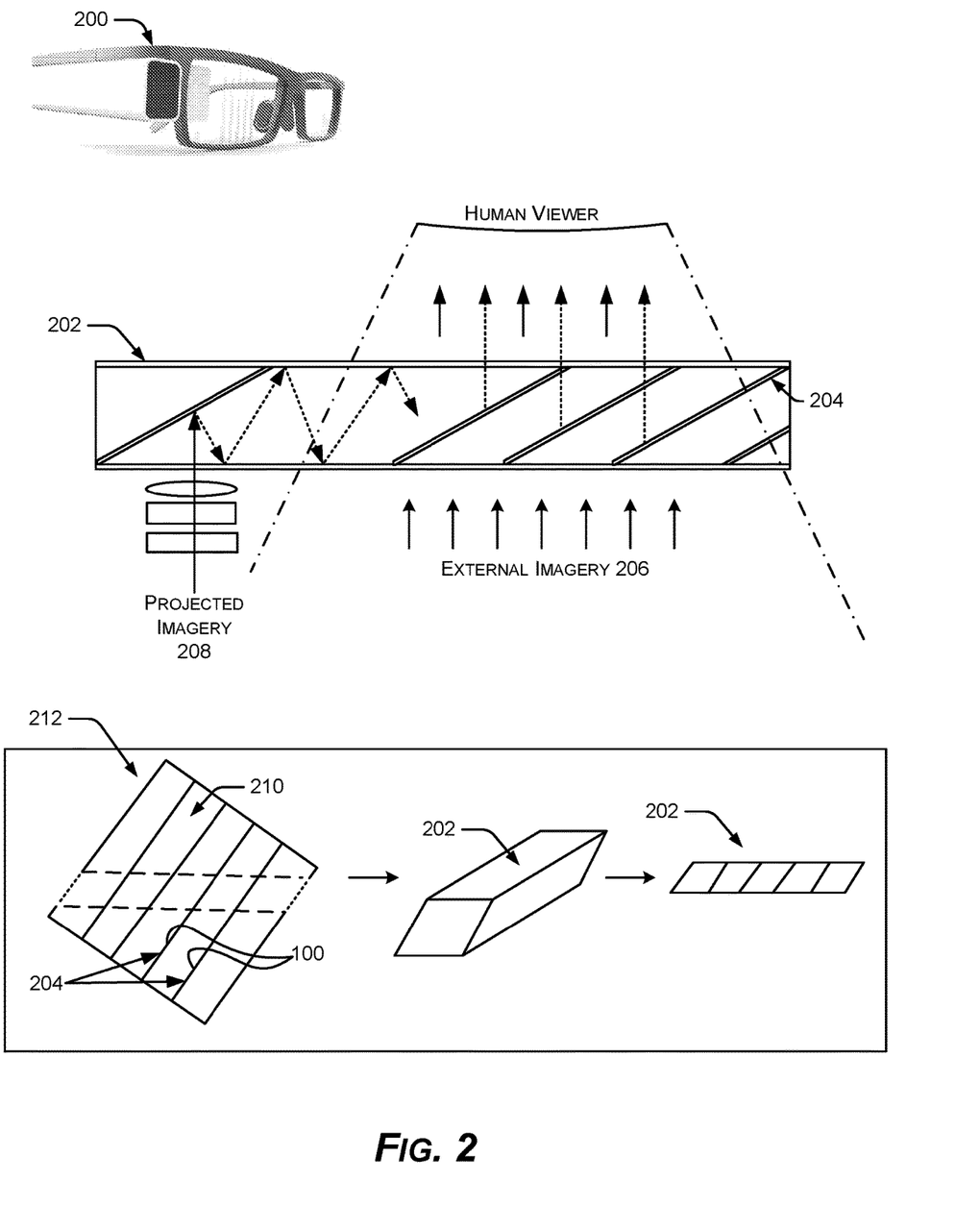
FIG. 2 is a diagram of an example mirrored optical waveguide that can be improved with direct-bonded surfaces between optical layers instead of surfaces joined with conventional adhesives.

FIG. 2 shows wearable computer glasses 200 that add information alongside or in addition to what the user observes through the lenses. Such smartglasses 200 may benefit from optics that incorporate the example direct bonding interfaces 100 described herein. Example conventional smartglasses or their conventional mirrored waveguides are made by companies such as Lumus (Rechovot, Israel), Optinvent (Rennes, France), and Journey Technologies (Beijing, China). An example waveguide assembly 202 may use a series of partially reflective surfaces 204 to mirror a projected image, as described in U.S. Pat. Nos. 6,829,095 and 8,432,614, which are incorporated herein in their entireties. The partially reflective surfaces 204 allow external real-time imagery 206 to pass through the lenses of the smartglasses 200, while also reflecting projected imagery 208 to the human viewer. Because of the relatively small dimensions of the optical parts, the conventional optical adhesives used to laminate lenses and multiple glass layers together present extra layers of material in the light path that decrease the image quality. This lamination with conventional adhesives, especially at the interface of the reflective mirrored surfaces 204, can create perceived visible lines in the viewing field, undesirable to the viewer. The example lamination process described herein to make direct bonding interfaces 100 can laminate the optical layers together without conventional adhesives, resulting in more precise imagery and elimination of the artifactual lines in the viewing field. The example direct bonding interfaces 100 described herein enable better clarity for both the pass-through imagery 206 and the projected imagery 208 reflected to the human viewer off the array of partially reflective mirrored surfaces 204.

In an example process for making the mirrored waveguides 202 that use an array of reflective mirror surfaces 204 for near-eye optics, multiple glass layers or pieces 210 are coated with a layer that is at least partially reflective, then direct-bonded together into a stack 212. The direct bonding interfaces 100 can create the reflective surfaces 204 between each layer 210. The laminated stack 212 is then diced at an oblique angle to a perpendicular of the reflective surfaces 204 to produce the mirrored waveguide 202, with reflective surfaces 204 situated at a useful angle for guiding projected images 208 to the human eye.

Figure 3:
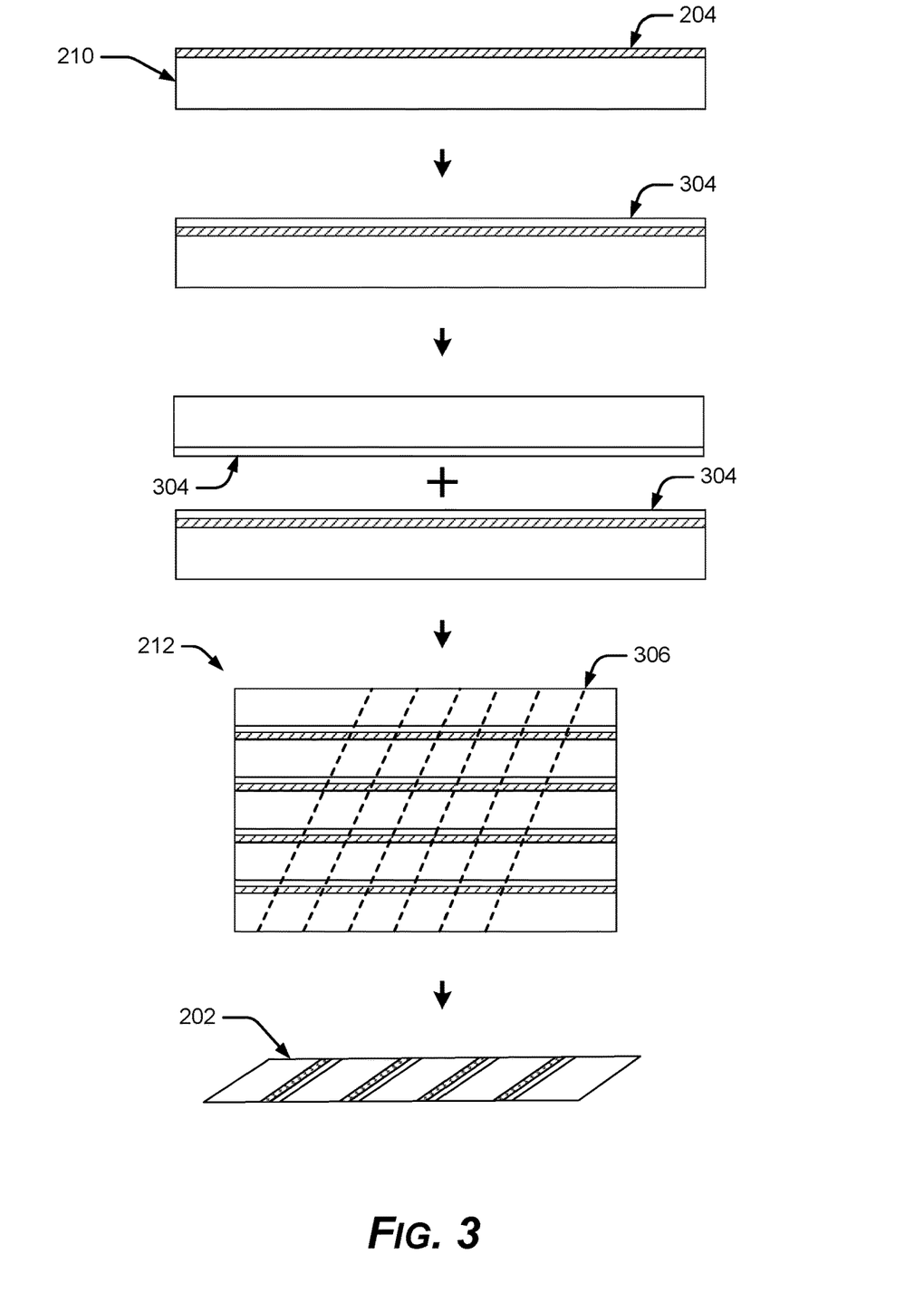
FIG. 3 is an example method of making mirrored optical waveguides using optical components with surfaces direct-bonded together instead of adhered together with adhesive materials.

FIG. 3 shows an example process of making the example mirrored waveguide 202 with direct oxide-bonded reflective surfaces. In an implementation, a thin layer of fully or partially reflective mirror coating 204 is deposited on a glass wafer or panel 210. Then, a thin layer of silicon oxide (e.g., $SiO_2$) 304 that is approximately 0.01-5.00 μm thick is deposited on top of the thin mirror coating 204 on the glass wafer or panel 210. The glass panel 210 is direct oxide-bonded to the next glass panel 210, via a respective oxide layer 304.

In another implementation, a thin layer of silicon nitride ($Si_3N_4$), silicon oxynitride (SiON), or silicon carbonitride (SiCN) can be deposited as an alternative to $SiO_2$, layer 304. In another implementation, a combination of the above layers ($SiO_2$, $Si_3N_4$, SiON, and/or SiCN) can be deposited on top of the thin mirror coating 204 on the glass wafer or panel 210.

Repeating the coating and bonding steps above creates the multi-wafer or multi-panel stack 212. With the laminations vertical, the stack 212 is vertically diced or singulated at an angle 306 as shown, to produce the individual mirrored waveguides 202.

In various implementations, example apparatuses may include a first optically transparent substrate including a first flat surface, a second optically transparent substrate including a second flat surface, and a direct chemical bond between a material of the first flat surface of the first optically transparent substrate and a material of the second flat surface of the second optically transparent substrate.

The material of the first flat surface and the material of the second flat surface may comprise the same material bonded to itself across the direct bond. The direct bond itself may comprise a direct silicon oxide-to-silicon oxide bond between the first flat surface and the second flat surface. The direct bond can be a contact bond spontaneously formed at room temperature, such as a ZiBond® brand direct bond or a DBI® brand hybrid direct bond, when metallic components such as mountings or electrical conductors are involved in the direct bond interface, both bonding techniques available from Invensas Bonding Technologies, Inc. (formerly Ziptronix, Inc.), an Xperi company (see for example, U.S. Pat. Nos. 6,864,585 and 7,485,968, which are incorporated herein in their entirety).

As part of the direct bonding process, the first flat surface and the second flat surface may be polished flat by a chemical-mechanical polishing (CMP) tool. The first flat surface and the second flat surface may then be activated by a plasma process in preparation for the formation of the direct chemical bond, such as a nitrogen-based plasma etch process or a reactive ion plasma etch process.

The direct bond is formed at room temperature, and then after formation, can be strengthened by annealing at a higher temperature of approximately 150° C. and above.

As a mirrored waveguide 202, an example apparatus has at least partially reflective coatings 204 on one or both of the first flat surface and the second flat surface. The fully or partially reflective coating can be aluminum, silver, gold, platinum, mercury, magnesium fluoride, titanium dioxide, silicon dioxide, zinc sulphide, tantalum pentoxide, a reflective dielectric, or a Bragg mirror, or the combination of two or more such coatings, for example. Other partially or fully reflective coatings, not included in the above list, may also be used.

The laminated bond between optical surfaces may include one or more thin layers of a silicon oxide or $Si_3N_4$, SiON, and/or SiCN covering each reflective coating 204, prior to the direct oxide or direct oxide-to-oxide bonding. Since the oxide layer(s) are ultra-thin, at approximately 0.01-5.00 μm, the resulting bond may be considered optically clear, or may be considered a large improvement over much thicker layers of optically dense adhesive, as conventionally used. A given apparatus may also have one or more layers of one or more optically transparent dielectrics covering each reflective coating 204, as desired for a given application. As a mirrored waveguide 202, other optical and display components may be added to create smartglasses, head-up displays (HUDs), or other optical devices.

Figure 4:
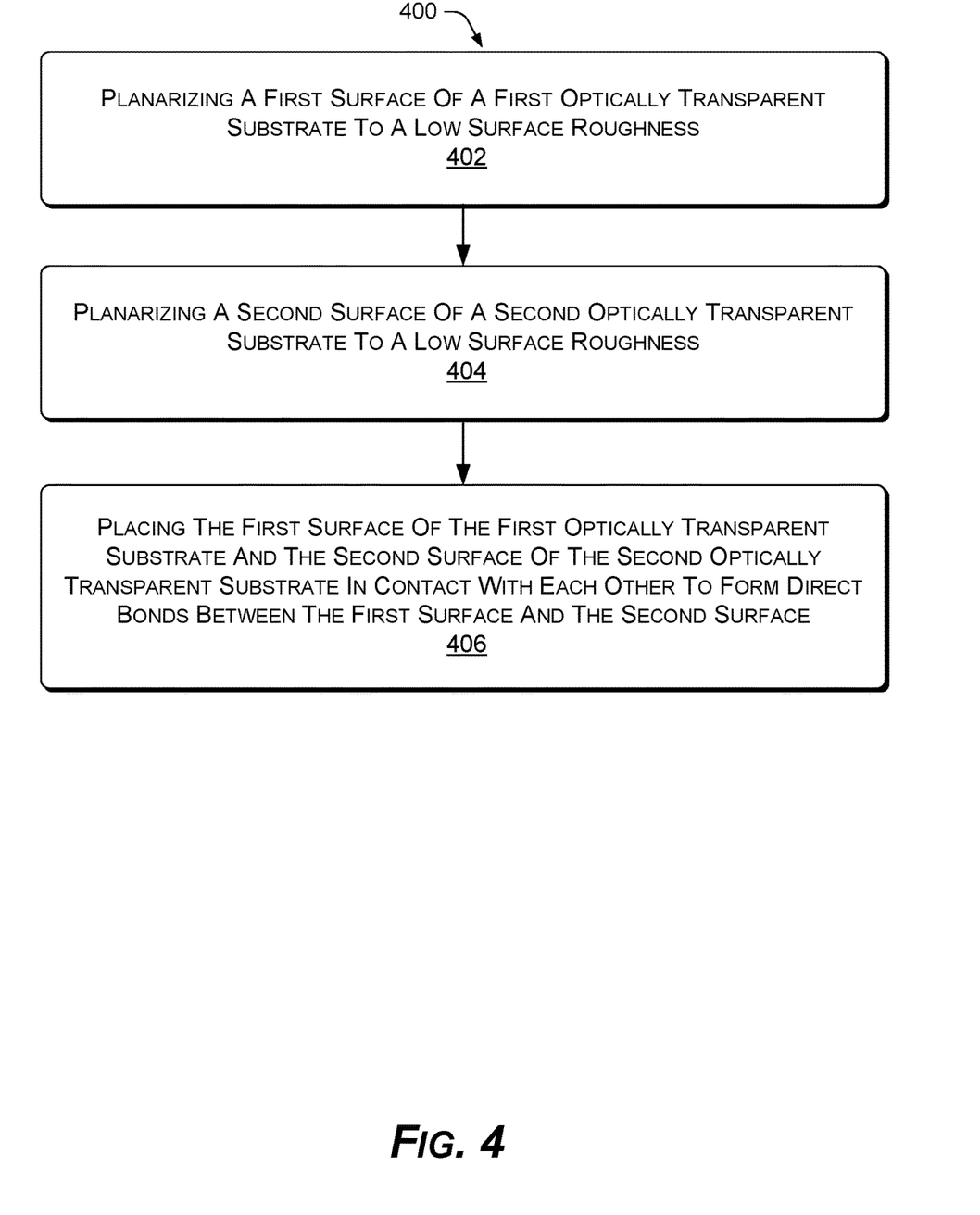
FIG. 4 is an example method of making joining or laminating optical layers with direct-bonded surfaces instead of optically dense conventional adhesives.

FIG. 4 shows an example method 400 of making laminated optical layers with direct-bonding instead of thicker layers of conventional optically dense adhesives. In FIG. 4, individual operations are shown as separate blocks.

At block 402, a first surface of a first optically transparent substrate is planarized to a low surface roughness.

At block 404, a second surface, of a second optically transparent substrate, is also planarized to a low surface roughness.

At block 406, the first surface of the first optically transparent substrate and the second surface of the second optically transparent substrate are placed in contact with each other to form direct bonds between the first surface and the second surface.

In the example method 400, the first optically transparent substrate and the second optically transparent substrate may be glasses (for example, quartz, fused silica, borosilicate glass, sapphire, crown glass, flint glass, and so forth) but can also be polymers, ceramics, and other materials too. The first optically transparent substrate and the second optically transparent substrate can each be layers of an optical device, such as an optical waveguide, a prism, a collimator, a lens, a reflector, a mirror, a combiner, a beam splitter, and a diffraction grating.

The first surface of the first optically transparent substrate and the second surface of the second optically transparent substrate are placed in contact with each other at an ambient room temperature to form the bond between the first surface and the second surface at room temperature, and after forming the bonds, the process may optionally include heating the first optically transparent substrate and the second optically transparent substrate, or their bonded surfaces, to a temperature of approximately 150° C. to strengthen the bonds. The subsequent annealing process, or passage of time, strengthens the bond with low bond distortion, minimal bond stress, and increased bond hermeticity (water-tightness and air-tightness). The first and second optically transparent substrates are then cooled to a room temperature, when annealing is used.

The example method 400 works on non-transparent or even opaque substrates and materials too.

Planarizing the first surface of the first optically transparent substrate and the second surface of the second optically transparent substrate to a low surface roughness may entail polishing the first and second surfaces with a chemical-mechanical polishing (CMP) tool. Or the surfaces may be made sufficiently flat during their formation or manufacture.

The example method 400 may also include activating the first surface and the second surface with a plasma process in preparation for the spontaneous formation of the bonds between the two surfaces at room temperature. The plasma process may be a nitrogen-based etch process or a reactive ion etch process. The subsequent thermal treatment and time improves the bond strength.

To make mirrored waveguides, the method 400 includes depositing a reflective coating on one or both of the first surface or the second surface. The reflective coating may be partially reflective, for pass-through or HUD applications. The reflective coating may be aluminum, silver, gold, platinum, or mercury, and also magnesium fluoride, titanium dioxide, silicon dioxide, zinc sulphide, tantalum pentoxide, a reflective dielectric, or a Bragg mirror, or the combination of two or more such coatings, may also be used as layers.

The reflective coating may be covered by a thin layer of an oxide or a nitride (0.01-5.00 μm thickness). Forming the spontaneous chemical bonds may consist of direct oxide-to-oxide bonding respective layers of the thin oxide or nitride on the first optically transparent substrate and the second optically transparent substrate. The reflective coating(s) may also be covered with one or more layers of one or more optically transparent dielectrics.

The process is repeated to make a stack of optically transparent substrates comprising an optical waveguide, or a mirrored optical waveguide. A reflective coating is added to at least some the optically transparent substrates of the stack to make a waveguide with an array of multiple embedded mirror surfaces.

The direct bonding, direct oxide bonding, or direct oxide-to-oxide bonding may be DBI® brand bonding or ZiBond® brand direct oxide bonding, both available from Invensas Bonding Technologies, Inc. (formerly Ziptronix, Inc.), an Xperi company (see for example, U.S. Pat. Nos. 6,864,585 and 7,485,968, which are incorporated herein in their entirety). ZiBond® brand direct bonding, for example, is a low-temperature wafer-to-wafer or die-to-wafer or die-to-die bonding technique between wafers or dies with the same or different coefficients of thermal expansion (CTE), using a low-temperature homogeneous (oxide-to-oxide) direct bonding technology. ZiBond direct bonding offers multiple benefits over conventional bonding techniques such as adhesives, anodic bonding, eutectic bonding and glass frit. Bonding is performed at room temperature, which enhances overall yield and reliability, by eliminating the negative effects associated with coefficient of expansion (CTE) mismatch, warpage and distortion. Higher throughput and lower cost-of-ownership are realized by using industry-standard wafer alignment and bonding equipment. Without requiring elevated temperature or high pressure during bonding, the high-throughput of the ZiBond direct bonding fabrication process minimizes cost-of-manufacturing during mass-production for high volume market applications. During ZiBond direct bond processing, industry standard dielectric surfaces like silicon dioxide or silicon carbide nitride are polished to low surface roughness using conventional chemical-mechanical polishing (CMP) tools, and nitrogen-based chemistries are applied through conventional plasma etch processing. Prepared wafer surfaces are then simply aligned and placed together, resulting in the spontaneous formation of chemical bonds between dies and/or wafers. A very strong, low distortion bond with a bond strength about half the strength of silicon can be obtained at room temperature, and a reliable hermetic bond stronger than silicon can be obtained after moderate heating to about 150° C. in batch processes outside of the alignment and placement tool, for example.

In the specification and following claims: the terms "connect," "connection," "connected," "in connection with," and "connecting," are used to mean "in direct connection with" or "in connection with via one or more elements." The terms "couple," "coupling," "coupled," "coupled together," and "coupled with," are used to mean "directly coupled together" or "coupled together via one or more elements."

While the present disclosure has been disclosed with respect to a limited number of embodiments, those skilled in the art, having the benefit of this disclosure, will appreciate numerous modifications and variations possible given the description. It is intended that the appended claims cover such modifications and variations as fall within the true spirit and scope of the disclosure.

The invention claimed is:

1. A method of forming a mirrored optical waveguide, the method comprising:
  depositing one or more reflective coatings on at least a first optically transparent substrate, wherein the one or more reflective coatings is at least partially reflective;
  providing an inorganic dielectric layer over the one or more reflective coatings, the inorganic dielectric layer forming a first surface of the first optically transparent substrate;
  providing a second optically transparent substrate having a second surface;
  placing the first surface and the second surface together to form a stack;
  forming a refractory interface via a direct bond between the first surface and the second surface at room temperature, wherein the refractory interface has a same coefficient of thermal expansion as a coefficient of thermal expansion of at least one of the first surface or the second surface; and
  dicing the stack at an oblique angle to a perpendicular of the one or more reflective coatings.

2. The method of claim 1, wherein:
  the first optically transparent substrate comprises one of a glass, a fused silica, a quartz, a sapphire, a borosilicate, a plastic, or a ceramic; and
  the second optically transparent substrate comprises one of a glass, a fused silica, a quartz, a sapphire, a borosilicate, a plastic, or a ceramic.

3. The method of claim 1, wherein the first surface and the second surface are placed together at an ambient room temperature to form spontaneous chemical bonds between the first surface and the second surface.

4. The method of claim 3, further comprising:
  after forming the spontaneous chemical bonds, heating the first optically transparent substrate and the second optically transparent substrate to a temperature of approximately 150° C. to strengthen the spontaneous chemical bonds; and
  cooling the first optically transparent substrate and the second optically transparent substrate to a room temperature.

5. The method of claim 1, further comprising forming the direct bond at room temperature.

6. The method of claim 1, further comprising annealing the direct bond at a temperature greater than the boiling point temperature of water.

7. A method of forming a mirrored optical waveguide, the method comprising:
depositing one or more reflective coatings on at least one of (i) a first optically transparent substrate or (ii) a second optically transparent substrate, wherein the one or more reflective coatings is at least partially reflective, wherein the one or more reflective coatings at least partially defines at least one of a first surface of the first optically transparent substrate or a second surface of the second optically transparent substrate;
forming a refractory interface via a direct oxide bond between the first surface and the second surface at a room temperature, wherein the refractory interface has a same coefficient of thermal expansion as a coefficient of thermal expansion of at least one of the first surface or the second surface; and
dicing the stack at an oblique angle to a perpendicular of the one or more reflective coatings.

8. The method of claim 7, wherein the plasma process comprises one of (i) a nitrogen-based etch process or (ii) a reactive ion etch process.

9. The method of claim 1, wherein at least one of the one or more reflective coatings is fully reflective.

10. The method of claim 1, wherein the one or more reflective coatings comprises one or more of aluminum, silver, gold, platinum, mercury, magnesium fluoride, titanium dioxide, silicon dioxide, zinc sulphide, tantalum pentoxide, a reflective dielectric, or a Bragg mirror.

11. The method of claim 1, further comprising:
covering the one or more reflective coatings with one or more layers of a silicon oxide, silicon nitride, silicon carbonitride or silicon oxynitride; and
forming spontaneous chemical bonds between respective layers of the silicon oxide, silicon nitride, silicon carbonitride or silicon oxynitride on the first optically transparent substrate and the second optically transparent substrate.

12. The method of claim 7, further comprising:
covering the one or more reflective coatings with one or more layers of one or more optically transparent dielectrics.

13. An apparatus, comprising:
a first optically transparent substrate comprising a first plasma-activated surface and a first inorganic dielectric layer at least partially defining the first surface of the first optically transparent substrate;
a second optically transparent substrate comprising a second plasma-activated surface, one or more reflective coatings on the second optically transparent substrate and a second inorganic dielectric layer on the one or more reflective coatings, the second inorganic dielectric layer at least partially defining the second surface of the second optically transparent substrate, wherein the one or more reflective coatings is at least partially reflective;
a direct bond between the first inorganic dielectric layer and the second inorganic dielectric layer; and
a refractory interface between the first plasma-activated surface and the second plasma-activated surface, wherein the refractory interface has a same coefficient of thermal expansion as a coefficient of thermal expansion of at least one of the first plasma-activated surface or the second plasma-activated surface and
wherein the apparatus has a diced surface at an oblique angle with respect to a perpendicular of the one or more reflective coatings.

14. The apparatus of claim 13, wherein:
the first plasma-activated surface and the second plasma-activated surface comprise a same material bonded to itself across the direct bond.

15. The apparatus of claim 13, wherein the direct bond comprises a direct bond of one of silicon oxide, silicon nitride, silicon carbonitride or silicon oxynitride between the first plasma-activated surface and the second plasma-activated surface.

16. The apparatus of claim 13, wherein:
the first optically transparent substrate comprises a glass, a fused silica, a quartz, a sapphire, a borosilicate, a plastic, or a ceramic; and the second optically transparent substrate comprises a glass, a fused silica, a quartz, a sapphire, a borosilicate, a plastic, or a ceramic.

17. The apparatus of claim 13, wherein at least one of the one or more reflective coatings is fully reflective.

18. The apparatus of claim 13, wherein the one or more reflective coatings comprises one or more of aluminum, silver, gold, platinum, mercury, magnesium fluoride, titanium dioxide, silicon dioxide, zinc sulphide, tantalum pentoxide, a reflective dielectric, and a Bragg mirror.

19. The apparatus of claim 13, further comprising:
a layer of a silicon oxide, silicon nitride, silicon carbonitride or silicon oxynitride on the one or more reflective coatings.

20. The apparatus of claim 13,
wherein the inorganic dielectric layer comprises one or more optically transparent dielectric layers over the one or more reflective coatings.

21. The apparatus of claim 13, wherein the first and second plasma-activated surfaces are sufficiently flat to allow a direct bond to be formed between the first plasma-activated surface and the second plasma-activated surface without an adhesive.

22. The apparatus of claim 13, wherein the first and second plasma-activated surfaces are polished using chemical mechanical polishing prior to formation of the direct bond.

23. The apparatus of claim 13, wherein the first plasma-activated surface comprises a nitrogen-based plasma-activated surface.

24. The apparatus of claim 13, wherein the direct bond comprises a bond interface comprising nitrogen.

25. A method of forming a mirrored optical waveguide, the method comprising:
depositing one or more reflective coatings on (i) a first optically transparent substrate and (ii) a second optically transparent substrate, wherein the one or more reflective coatings is at least partially reflective;
covering the one or more reflective coatings on the first optically transparent substrate with a layer of a silicon oxide, silicon nitride, silicon carbonitride or silicon oxynitride, wherein the layer of the silicon oxide, silicon nitride, silicon carbonitride or silicon oxynitride comprises a first surface of the first optically transparent substrate;
covering the one or more reflective coatings on the second optically transparent substrate with a layer of a silicon oxide, silicon nitride, silicon carbonitride or silicon oxynitride, wherein the layer of the silicon oxide, silicon nitride, silicon carbonitride or silicon oxynitride comprises a second surface of the second optically transparent substrate;

placing the first surface and the second surface together to form a stack; forming spontaneous chemical bonds between respective layers of the silicon oxide, silicon nitride, silicon carbonitride or silicon oxynitride on the first optically transparent substrate and the second optically transparent substrate; and dicing the stack at an oblique angle to a perpendicular of the one or more reflective coatings.

26. The method of claim 25, further comprising:

after forming the spontaneous chemical bonds, heating the first optically transparent substrate and the second optically transparent substrate to a temperature of approximately 150° C. to strengthen the spontaneous chemical bonds; and cooling the first optically transparent substrate and the second optically transparent substrate to a room temperature.

27. The method of claim 26, further comprising:

prior to formation of the spontaneous chemical bonds, activating the first surface and the second surface with a plasma process.

28. The method of claim 27, wherein the plasma process comprises one of (i) a nitrogen-based etch process or (ii) a reactive ion etch process.

* * * * *

UNITED STATES PATENT AND TRADEMARK OFFICE
CERTIFICATE OF CORRECTION

PATENT NO. : 12,270,970 B2
APPLICATION NO. : 17/587921
DATED : April 8, 2025
INVENTOR(S) : Belgacem Haba et al.

It is certified that error appears in the above-identified patent and that said Letters Patent is hereby corrected as shown below:

On the Title Page

Column 2, Page 5, Line 20, delete "of p- SionGaAs wafers" and insert -- of p-SionGaAs wafers --.

Column 2, Page 6, Line 57, delete "1(a)-1(I), 6" and insert -- 1(a)-1(l), 6 --.

In the Claims

Column 9, Claim 7, Line nos. 14 (approx.), delete "transparent substrate; forming" and insert
-- transparent substrate; activating the first surface and the second surface with a plasma process; after
the activating, placing the first surface and the second surface together to form a stack, wherein the
first surface and the second surface are placed together at an ambient temperature to form spontaneous
chemical bonds between the first surface and the second surface; forming --.

Signed and Sealed this
Nineteenth Day of August, 2025

Coke Morgan Stewart
*Acting Director of the United States Patent and Trademark Office*